United States Patent [19]
Kreger

[11] 3,987,396
[45] Oct. 19, 1976

[54] REPEATER SYSTEM
[75] Inventor: James H. Kreger, Cincinnati, Ohio
[73] Assignee: Xetron Corporation, Cincinnati, Ohio
[22] Filed: July 17, 1975
[21] Appl. No.: 596,916

[52] U.S. Cl. .................................. 325/7; 325/8; 325/346
[51] Int. Cl.² ....................................... H04B 7/14
[58] Field of Search .................. 325/7, 8, 12, 346

[56] References Cited
UNITED STATES PATENTS
3,329,900  7/1967  Graves .............................. 325/346
3,766,478  10/1973  Lowry ................................. 325/8

Primary Examiner—Thomas B. Habecker
Attorney, Agent, or Firm—Irwin P. Garfinkle

[57] ABSTRACT

A radio frequency FM repeater system receives and retransmits at the same frequency, the retransmitted signal having the same deviation as the received signal. To accomplish this the IF filter is notched at its center frequency and the receiver feedback loop is inhibited when the received IF is within the notch, i.e., at the IF center frequency. In addition, the system is stabilized and the deviations of the received and retransmitted signals are kept equal by using positive feedback within the FM receiver, the feedback loop having a gain of 0.5.

15 Claims, 5 Drawing Figures

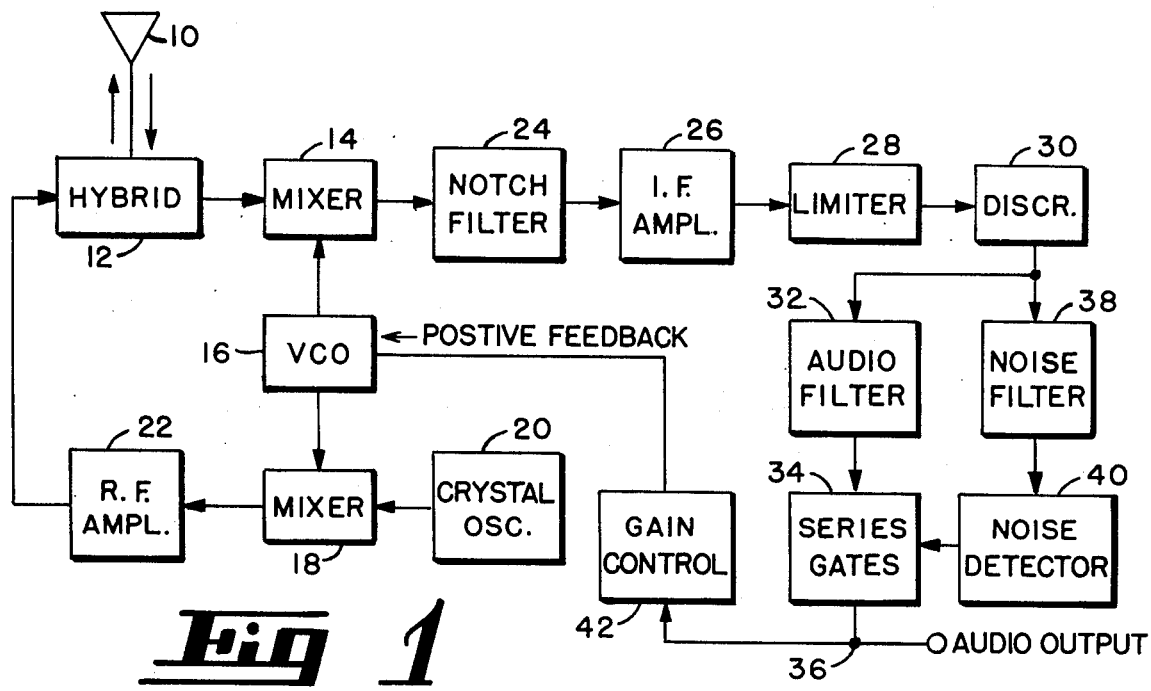
*Fig 1*
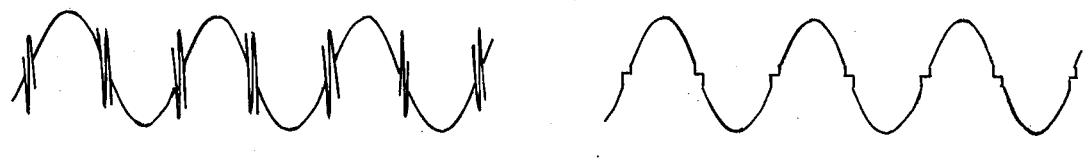
*Fig 2*  *Fig 3*
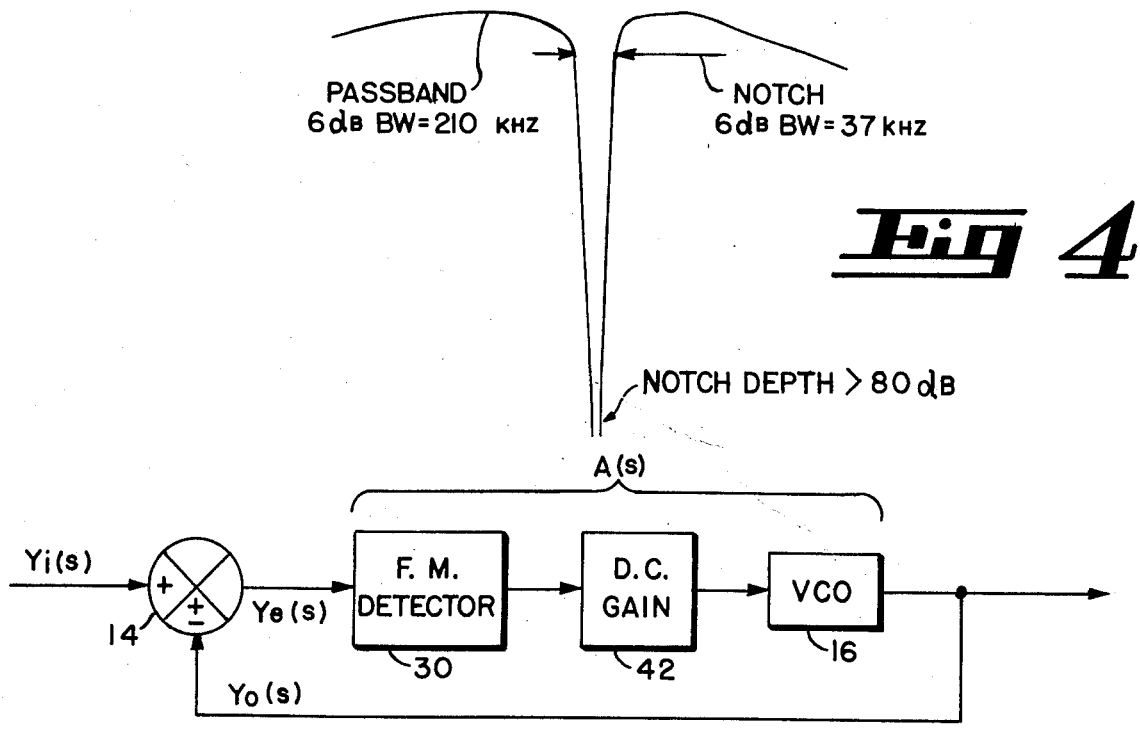
*Fig 4*
*Fig 5*

REPEATER SYSTEM

BACKGROUND OF THE INVENTION

Radio frequency repeating systems are used as a means for increasing the communications range or for enhancing the received signal strength and thereby lowering the error rate within the communications link. The most common system includes the receiving of a signal at frequency $F_1$, shifting it to frequency $F_2$, amplifying the shifted frequency and retransmitting it at a higher power level. This $F_1F_2$ system avoids interference between the received and retransmitted signals, but it occupies twice the bandwidth. A number of systems have been proposed for operation at the same input and output frequency. This invention discloses significant improvements to those $F_1F_1$ repeating systems which use negative FM feedback. The classic use of negative FM feedback is disclosed in Enloe in an article published in the Proceedings of the IRE, January 1962, page 18, and entitled "Decreasing the Threshold in FM by Frequency Feedback". Enloe shows that negative FM feedback can result in system instability especially at gain levels required to create a useful retransmitted index of modulation. Negative feedback FM by definition produces a reduction of peak-to-peak deviation and as taught by Enloe is used for the purpose of threshold extension. The use of negative feedback in $F_1F_1$ repeaters has resulted in poor stability and in non-equal retransmitted deviations.

Negative feedback systems, as practiced in the prior art, utilize a feedback loop in which the peak-to-peak deviation of the received IF signal is reduced. Generally this is accomplished by varying the frequency of the system oscillator so as to offset the received signal instantaneous frequency modulation at the mixer output. Such a system produces a change in the deviation at the output as compared with the deviation of the input signal, except when the gain of the feedback loop is infinite. Stated in another way, deviation at the receiver input is fixed. Deviation at the receiver IF is reduced as a function of the negative feedback loop gain until the deviation at the IF is zero when the gain is infinite. It is only when the gain is infinite and the IF deviation is zero that the transmitted deviation equals the received deviation. Since a practical system does not have infinite loop gain, the retransmitted signal will have a different deviation from the received signal. The system disclosed in accordance with this invention overcomes this problem of the prior art by using a positive feedback system, and it provides stability by providing a loop gain of less than one.

In addition, many prior art systems utilize a single antenna for both receiving and retransmitting, and isolation is provided by means of the well-known hybrid. However, hybrids never are 100% efficient and various techniques are provided for preventing the retransmitted signal from acting upon the receiver. The most common technique is to reduce retransmitting power. However, in accordance with this invention I provide the receiver IF filter with a narrow notch at its center frequency, and thus provide additional isolation in the receiver from the retransmitted signal. Moreover, I am able to maintain a large deviation rate because of the use of a positive feedback system, the time the IF frequency is within the narrow notch is reduced. Thus, the use of the notched IF filter in combination with positive feedback from the audio to the IF permits me to increase the retransmitted power levels. The notch is able to perform its function of isolation since the retransmitted signal in the IF is a fixed nonmodulated, nondeviated signal (CW) and as such theoretically occupies zero bandwidth and therefore can be notched out by a very narrow band notch filter.

DESCRIPTION OF THE DRAWINGS

FIG. 1 is a block diagram of an FM repeater made in accordance with the invention;

FIG. 2 is a curve illustrating the presence of noise in the received signal;

FIG. 3 is a curve illustrating the received signal with noise removed in accordance with the invention;

FIG. 4 is a curve illustrating the response characteristics of the notch filter; and FIG. 5 is a schematic illustrating the operation of the invention.

DESCRIPTION OF THE ILLUSTRATIVE EMBODIMENT

An $F_1F_1$ repeater made in accordance with this invention is schematically shown in FIG. 1. It utilizes all conventional circuitry and is similar to typical prior art repeaters, except in two respects. It is similar in that it receives a signal at frequency $F_1$. It then reconstructs the signal, amplifies it and retransmits it at the same frequency $F_1$. The difference from the prior systems are (1) it uses an IF filter with a narrow notch at its center frequency for preventing the retransmitted signal from entering the receiver in combination with a noise squelch operable to eliminate noise detected in the notch; and (2), it uses positive feedback in a feedback loop having a gain less than unity. The advantages of these differences will be more apparent as the description of the invention proceeds.

Referring to FIG. 1, the $F_1F_1$ repeater is shown as having an antenna 10 which is used for both receiving and transmitting. For the purpose of isolating the received and transmitted signals, a conventional hybrid junction 12 is used.

The received signal is derived from the hybrid 12 and is applied to a conventional mixer 14. The mixer 14 is also supplied with one of the outputs of a voltage controlled oscillator, VCO 16, which, as will be shown hereinafter, is frequency modulated by the audio signal. The VCO 16 also supplies one input of a second mixer 18, the other input of mixer 18 being supplied with the fixed frequency output of a crystal oscillator 20 operating at the same frequency as the center of the notch filter, such that the original RF frequency is generated and supplied to an RF amplifier 22. The amplified RF signal is then supplied through the hybrid 12 to the antenna 10 for retransmission at a higher level of energy than received.

The IF output of the mixer 14 is applied to a notched IF filter 24 having the characteristics shown in the curve in FIG. 4. The output of the notched IF 24 is amplified in IF amplifier 26 and limited in a limiter 28.

The output of limiter 28 is applied to a discriminator 30 from which audio is developed. The desirable signal components of the audio output are applied to an audio signal filter 32 and then through a series gate 34 to the audio output terminal 36.

The output of the discriminator 30 is also applied to a noise filter 38, the output of which is applied to a noise detector 40. In the presence of noise, the output from detector 40 serves to ground or open the series gate 34 to prevent the presence of an audio signal at terminal 36. The voltage appearing at terminal 36 is applied to the VCO 16 through a gain control circuit 42. The gain of the audio is fed back to the VCO 16 as positive feedback at a gain of less than unity and it serves to modulate the VCO 16.

The VCO 16 is mixed simultaneously in mixers 14 and 18, the output from the mixer 14 and filter 24 providing an IF with the center frequency "notched" or filtered out. The mixer 18 provides the modulated RF for amplification and retransmission.

NOISE GATING

Since the described system retransmits the same frequency it receives, the retransmitted signal is apt to get into the receiver and cause instability even where a relatively good efficiency hybrid is used. To reduce this problem I use the notched filter 24 at the output of the mixer to filter out the center frequency components of the IF over a very narrow range. The filter 24 has the characteristics shown in FIG. 4 and is designed to provide 80 db attenuation at the peak, and effectively to filter out a band of frequencies which is very narrow as compared to the overall pass band of the filter 24. During the period when the IF is within the notch of the filter 24 the noise level of the system becomes very high and the VCO 16 normally would be modulated by noise. The reason for this is the lack of a carrier to cause quieting of the FM receiver. I prevent noise modulation of the VCO 16 by noise gating, i.e., by inhibiting the modulating signal to VCO 16 at certain times.

Conventional FM receivers normally require IF bandwidths significantly larger than that of the baseband modulating frequencies, and normally the bandwidth of the IF is:

$$2(F_m + \Delta F)$$

where $F_m$ = highest desired baseband modulating frequency; and $\Delta F$ = peak frequency deviation caused by the baseband modulating frequency.

It follows that the IF bandwidth is normally much wider than that required following detection, and it is normal practice to follow the discriminator 30 with a filter 32 sufficient in width to pass only the modulating frequencies $F_m$. Under these circumstances where there is no received input signal, thermal noise and other noise internal to the receiver are amplified, limited and applied to the detector, i.e., discriminator 30. Such a system is said to be limiting on noise and the noise applied to the discriminator 30 occupies the full IF bandwidth, and after passing through the discriminator 30 produces frequency components higher in frequency than the normal baseband modulating frequencies for which the receiver is designed. Normally, therefore, the audio filter 32 rejects those components outside the modulating frequency bandwidth. For periods during which a received signal, with or without modulation, is present in the IF, such signal captures the limiter 28 and suppresses the subject noise, and the system is then limiting on signal.

It is well known in the art that a signal increase within the IF will cause a decrease in output detected noise, while a decrease in signal results in an increase in output detected noise. Taking advantage of this fact, I use a bandpass filter 38 which has its lower cut-off frequency above the highest modulating frequency $F_m$ and its upper cut-off frequency below the IF. Thus, the output of filter 38 is noise only during the absence of a signal within the IF. With signal in the IF, the lower cut-off frequency of filter 38 eliminates the presence of modulating frequency energy at its output.

It will be recalled that the notch filter 24 attenuates a narrow band of IF at the center frequency, and therefore the received signal frequency is being deviated through the IF notch. Thus, the system is alternately being noise limited and signal limited so that the filter 38 contains energy during the period that the signal is within the IF notch. This energy is detected in the conventional noise detector 40, the output of which is a voltage responsive to a predetermined threshold energy level output from filter 38. The presence of an output voltage in the output of noise detector 40 disables the series gate 34. Disabling may be accomplished by grounding the input of the gate, or disconnecting its output from the feedback loop to the VCO 16. In any case, the VCO is not modulated during the period the gates 34 are disabled and therefore the VCO 16 is effectively isolated from the noise present at the output of discriminator 30.

During the time noise energy is decreased (i.e., the signal is outside the notch frequencies), the gates 34 are enabled to pass audio signals to the VCO 16. Thus, the disclosed system eliminates the modulation of the VCO 16 by undesired noise, and hence eliminates the transmission of such noise via mixer 18, RF amplifier 22 and the hybrid 12. FIGS. 2 and 3 compare the transmitted signal without and with noise gating, respectively.

POSITIVE FEEDBACK

The prior art teaches the use of negative feedback to stabilize operation of an FM system such as disclosed herein. For example, see an article published by Enloe in January 1962 on page 18 of the Proceedings of the I.R.E., entitled "Decreasing the Threshold in FM by Frequency Feedback". Negative feedback, as applied to the embodiment shown in FIG. 1, would serve to reduce the effective peak-to-peak deviation at the intermediate frequency. On the other hand, I apply a feedback from the audio gates through a gain control circuit 42 to the VCO 16 in such a manner as to increase the peak-to-peak deviation.

In accordance with the prior art negative feedback systems, the amount of reduction in deviation over and above that present in the input signal is a function of gain within the feedback loop. Assuming that the modulating components causing the time rate of change of frequency are within the loop bandwidth, the deviation at the IF is zero only if the loop gain is infinite. The ratio of the deviation at the IF to that of the incoming signal can be termed error and can be expressed as follows:

$$\text{Error} = \frac{\text{Deviation at } IF}{\text{Deviation at } RF} = \frac{1}{1+G}$$

where $G$ = feedback loop gain. Thus, only if the loop gain approaches infinity will the error approach zero and will the VCO 16 be frequency modulated at the same rate and with the same deviation as the incoming signal. In the practical case where the loop gain is finite, the VCO 16 is frequency modulated at a lesser deviation than the incoming RF and, therefore, the output of mixer 18 will be at a frequency equal to the received frequency but deviated to a lesser extent. Such reduced index of modulation causes corresponding reduction in signal-to-noise ratio experienced at the end receiving station in a repeater system, especially where the end station is optimized for receiving deviations or indexes of modulation present on the original signal. This invention, by using positive feedback in the VCO feedback loop, and by maintaining loop gain at less than unity, results in the production of a stable system in which the received and retransmitted frequencies are deviated the same amounts.

In the system shown simplified in FIG. 5, it is desired that the peak-to-peak deviation at the output of the VCO 16 be equal in value to that of the received signal. The prior art negative feedback system is analyzed as follows:

(1) $Ye(s) = Yi(s) - Yo(s)$ where
$Ye(s)$ is peak-to-peak deviation in the IF
$Yi(s)$ is peak-to-peak deviation at input
$Yo(s)$ is peak-to-peak deviation at output (2) $Yo(s) = A(s) \cdot Ye(s)$ where
$A(s)$ is the overall feedback loop gain (3) $H(s) = \dfrac{Yo(s)}{Yi(s)} = \dfrac{A(s) \cdot Ye(s)}{Ye(s) + A(s) \cdot Ye(s)}$ $= \dfrac{A(s)}{1 + A(s)} = \dfrac{1}{\dfrac{1}{A(s)} + 1}$ ; where $H(s)$ is the input to output transfer function.
Since it is desired that $Yo(s) = Yi(s)$, then $\dfrac{Yo(s)}{Yi(s)} = 1 = \dfrac{1}{\dfrac{1}{A(s)} + 1}$ , and $\dfrac{Yo(s)}{Yi(s)} \to 1$, as $A(s) \to \infty$ Therefore, using negative feedback, the overall loop gain $A(s)$ must be infinite to achieve equal deviations. Such a system is not practical. However, by using positive feedback, the system will provide equal deviations and will be stable for all loop gains of less than unity.

The positive feedback system is similarly analyzed but with the sign of the feedback changed. Thus, $Ye(s) = Yi(s) + Yo(s)$ (3)
$Yo(s) = A(s) \cdot Ye(s)$ (1)

$H(s) = \dfrac{Yo(s)}{Yi(s)} = \dfrac{A(s) \cdot Ye(s)}{Ye(s) - A(s) \cdot Ye(s)}$ $= \dfrac{A(s)}{1 - A(s)} = \dfrac{1}{1/A(s) - 1}$ Thus:

$\dfrac{Yo(s)}{Yi(s)} = \dfrac{1}{1/A(s) - 1}$

Since it is desired that $Yo(s) = Yi(s)$, then $\dfrac{Yo(s)}{Yi(s)} = 1 = \dfrac{1}{1/A(s) - 1}$ -continued $\dfrac{Yo(s)}{Yi(s)} = 1$ for $A(s) = 0.5$ (−6 dB)

Thus, an overall loop gain of −6 dB will provide a retransmitted deviation equal to that received.

The system becomes unstable, $\dfrac{Yo(s)}{Yi(s)} \to \infty$ , only as $A(s) \to 1$ (0 dB).

The rate of change of the transfer function, $H(s)$, to gain, $A(s)$, variation can be found.

$\dfrac{dH(s)}{dA(s)} = \dfrac{d}{dA(s)} \dfrac{A(s)}{1 - A(s)} = \dfrac{1}{1 - 2A(s) + A(s)^2}$ (3)

at $A(s) = 0.5$ , $\dfrac{dH(s)}{dA(s)} = 4$

Solving equation (3) in terms of dB, one obtains:

$$\Delta H(s)_{dB} = \dfrac{(20 \log_{10} e)(10^{\dfrac{A(s)_{dB} + \Delta A(s)_{dB}}{20}} - 10^{\dfrac{A(s)_{dB}}{20}})}{10^{\dfrac{A(s)_{dB}}{20}}(1 - 10^{\dfrac{A(s)_{dB}}{20}})}$$ (4)

where
$\Delta H(s)$dB = dB change in $H(s)$, or dB change in retransmitted deviation
$A(s)_{dB}$ = loop gain in dB
$\Delta A(s)_{dB}$ = change in loop gain in dB
$e = 2.71828$ In addition to permitting the reconstruction of an identical signal for retransmission, the system provides an increased deviation by positive feedback (as compared with the deviation obtainable with negative feedback) and thus the relative size of the notch is reduced. Hence, the quality as well as the power of the reconstructed signal is improved.

While this invention has been disclosed and reduced to practice as an $F_1F_1$ system, positive feedback to stabilize operation and to retransmit at the same index of modulation can also be used in $F_1F_2$ systems. This can be achieved in the disclosed embodiment by setting the crystal oscillator 20 at a frequency other than the notch center frequency. In addition, the use of notch filter and gating arrangement will be equally applicable in such an $F_1F_2$ system.

What is claimed is:

1. A repeater system including means for receiving and retransmitting frequency modulated RF signals, the combination comprising:
   a variable frequency oscillator;
   means for mixing the output of said oscillator with said received signal to develop an intermediate frequency signal;
   means for detecting said intermediate frequency signal to develop an audio signal; and
   a positive feedback loop for providing a positive feedback from said audio signal to said mixing means, said loop having a gain of less than one, and including means for frequency modulating said variable frequency oscillator in response to said audio signal, said modulation having a sense tending to increase the peak-to-peak deviation of the intermediate frequency signal.

2. The invention as defined in claim 1 wherein said variable frequency oscillator is controlled as a function of said audio signal and the gain of said loop.

3. The invention as defined in claim 2, and a fixed frequency oscillator;
means for mixing output of said fixed frequency oscillator with the output of said variable frequency oscillator to develop an RF signal having a frequency and deviation equal to said received RF signal; and
means for retransmitting said developed RF signal.

4. The invention as defined in claim 3 wherein the gain of said loop is approximately −6dB.

5. The invention as defined in claim 4 wherein said means for receiving and retransmitting an RF signal comprises an antenna, said antenna being coupled to each of said mixing means through a hybrid junction, said hybrid serving to isolate the received and retransmitted signals.

6. The invention as defined in claim 1, and a filter for rejecting a narrow band of frequencies at the center frequency of said intermediate frequency whereby noise is detected at said narrow band; and
means responsive to detection of said noise for disabling said positive feedback loop.

7. The invention as defined in claim 6 wherein said means for disabling said positive feedback loop comprises:
a gate interposed between said detected audio signal and said variable frequency oscillator; and
means responsive to the detection of noise above a predetermined threshold for changing the state of said gate.

8. The invention as defined in claim 7 wherein said variable frequency oscillator is controlled as a function of said audio signal and the gain of said loop.

9. The invention as defined in claim 8, and a fixed frequency oscillator;
means for mixing output of said fixed frequency oscillator with the output of said variable frequency oscillator to develop an RF signal having a frequency and deviation equal to said received RF signal; and
means for retransmitting said developed RF signal.

10. The invention as defined in claim 9 wherein the gain of said loop is approximately −6dB.

11. The invention as defined in claim 10 wherein said means for receiving and retransmitting an RF signal comprises an antenna, said antenna being coupled to each of said mixing means through a hybrid junction, said hybrid serving to isolate the received and retransmitted signals.

12. The invention as defined in claim 1 wherein the received and retransmitted signals are at the same frequency.

13. A repeater system for receiving and retransmitting a frequency modulated RF signal, the combination comprising:
an antenna for receiving said RF signal;
a variable frequency oscillator;
a first mixer for mixing said received signal with the variable frequency output of said variable frequency oscillator to develop a frequency modulated IF signal;
a fixed frequency oscillator;
a second mixer for mixing the output of said fixed frequency oscillator and the output of said variable frequency oscillator to produce an RF signal having the same frequency as said received signal;
a notch filter for rejecting a narrow band of said IF signal at the center frequency thereof;
means following said notch filter for detecting said IF signal to develop an audio signal;
an audio filter having a bandpass within the normal audio range;
circuit means responsive to the output of said first audio filter for frequency modulating said variable frequency oscillator, the sense of such modulation producing an increase in the peak-to-peak deviation of said IF signal;
a noise filter having a bandpass within the normal noise range and outside the normal audio range; and
means responsive to the detection of noise in the output of said filter for disabling said circuit means.

14. The invention as defined in claim 13 wherein the gain of said circuit means is less than one.

15. The invention as defined in claim 13 wherein the gain of said circuit means is −6dB.

* * * * *